(12) United States Patent
Hattori et al.

(10) Patent No.: US 9,604,180 B2
(45) Date of Patent: Mar. 28, 2017

(54) FLUORINATED COPOLYMER AND ION EXCHANGE MEMBRANE

(71) Applicant: ASAHI GLASS COMPANY, LIMITED, Chiyoda-ku (JP)

(72) Inventors: Yukiko Hattori, Tokyo (JP); Shintaro Fukunaga, Tokyo (JP); Kazuo Umemura, Tokyo (JP); Shigeru Aida, Tokyo (JP); Atsushi Tsuji, Tokyo (JP); Toshinori Tomita, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 547 days.

(21) Appl. No.: 14/082,702

(22) Filed: Nov. 18, 2013

(65) Prior Publication Data

US 2014/0073709 A1    Mar. 13, 2014

Related U.S. Application Data

(63) Continuation of application No. PCT/JP2012/062690, filed on May 17, 2012.

(30) Foreign Application Priority Data

May 18, 2011    (JP) .................................. 2011-111289

(51) Int. Cl.
*B01D 71/44*    (2006.01)
*C08F 6/06*    (2006.01)
(Continued)

(52) U.S. Cl.
CPC .............. *B01D 71/44* (2013.01); *B01J 47/06* (2013.01); *B01J 47/12* (2013.01); *B32B 5/024* (2013.01);
(Continued)

(58) Field of Classification Search
USPC .................................................. 521/27, 38
See application file for complete search history.

(56) References Cited

U.S. PATENT DOCUMENTS

| | | | |
|---|---|---|---|
| 7,404,828 B1* | 7/2008 | Nicola ................. | B01D 9/0027 23/297 |
| 2009/0120788 A1* | 5/2009 | Kashiwada ............. | C25B 13/02 204/252 |

(Continued)

FOREIGN PATENT DOCUMENTS

| JP | 61-133211 | 6/1986 |
|---|---|---|
| JP | 7-118332 | 5/1995 |

(Continued)

OTHER PUBLICATIONS

International Search Report issued Jul. 24, 2012 in PCT/JP2012/062690 filed May 17, 2012.
(Continued)

*Primary Examiner* — Peter D Mulcahy
*Assistant Examiner* — Henry Hu
(74) *Attorney, Agent, or Firm* — Oblon, McClelland, Maier & Neustadt, L.L.P.

(57) ABSTRACT

To provide a fluorinated copolymer which is capable of providing an ion exchange membrane having little adverse effect due to impurities in an alkali chloride aqueous solution on electrolysis of the alkali chloride aqueous solution. To use a fluorinated copolymer of a fluorinated monomer having a carboxylic acid type functional group with a fluorinated olefin, wherein the proportion of components having a common logarithm (log M) of a molecular weight M being from 2.0 to 3.5 is at most 10 mass % per 100 mass % of components having a common logarithm (log M) of a molecular weight M being at least 2.0, contained in a $CClF_2CF_2CClFH$ soluble content.

17 Claims, 1 Drawing Sheet

(51) Int. Cl.
  *C08F 214/18* (2006.01)
  *C25B 1/46* (2006.01)
  *C08J 5/22* (2006.01)
  *B01J 47/12* (2017.01)
  *C08F 214/26* (2006.01)
  *C08F 6/00* (2006.01)
  *C25B 9/08* (2006.01)
  *B01J 47/06* (2006.01)
  *B32B 5/02* (2006.01)
  *B32B 7/06* (2006.01)
  *B32B 27/08* (2006.01)
  *B32B 27/12* (2006.01)
  *B32B 27/32* (2006.01)

(52) U.S. Cl.
  CPC ............... *B32B 7/06* (2013.01); *B32B 27/08* (2013.01); *B32B 27/12* (2013.01); *B32B 27/322* (2013.01); *C08F 6/003* (2013.01); *C08F 6/008* (2013.01); *C08F 6/06* (2013.01); *C08F 214/18* (2013.01); *C08F 214/26* (2013.01); *C08J 5/2237* (2013.01); *C08J 5/2243* (2013.01); *C25B 1/46* (2013.01); *C25B 9/08* (2013.01); *B32B 2307/748* (2013.01); *C08J 2327/12* (2013.01)

(56) References Cited

U.S. PATENT DOCUMENTS

| | | | | |
|---|---|---|---|---|
| 2009/0306233 | A1* | 12/2009 | Umemura | C08J 5/2237 521/27 |
| 2010/0179293 | A1* | 7/2010 | Hintzer | C08F 6/16 526/255 |
| 2010/0286352 | A1* | 11/2010 | Fukunaga | C08F 214/18 526/249 |
| 2015/0251107 | A1* | 9/2015 | Fontana | B01D 15/08 562/593 |

FOREIGN PATENT DOCUMENTS

| | | |
|---|---|---|
| JP | 11-49818 | 2/1999 |
| JP | 2005-82748 | 3/2005 |
| JP | 2007-77453 | 3/2007 |
| WO | 2009/133902 | 11/2009 |
| WO | WO-2009/133902 A1 * | 11/2009 |

OTHER PUBLICATIONS

U.S. Appl. No. 14/080,955, filed Nov. 15, 2013, Fukunaga, et al.
U.S. Appl. No. 14/099,477, filed Dec. 6, 2013, Aida, et al.

* cited by examiner

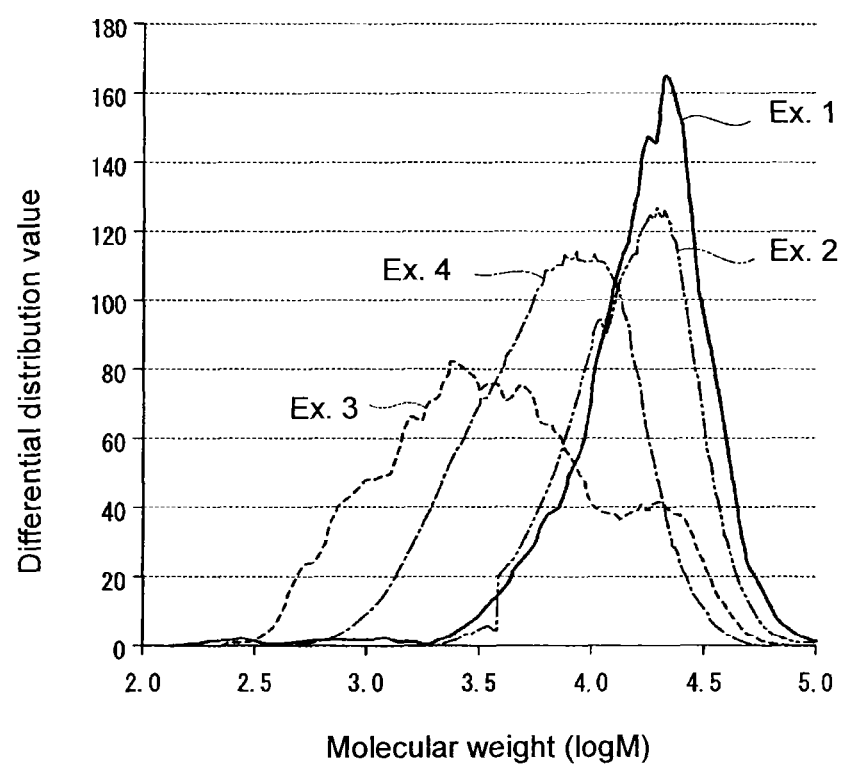

FLUORINATED COPOLYMER AND ION EXCHANGE MEMBRANE

CROSS REFERENCE TO RELATED APPLICATION

This application is a continuation of PCT/JP2012/062690, filed on May 17, 2012, and claims priority to Japanese Patent Application No. 2011-111289, filed on May 18, 2011.

TECHNICAL FIELD

The present invention relates to a fluorinated copolymer having a carboxylic acid type functional group, and an ion exchange membrane containing a fluorinated copolymer.

BACKGROUND ART

As an ion exchange membrane employed for an alkali chloride electrolytic process which comprises electrolyzing an aqueous alkali chloride solution such as seawater to produce an alkali hydroxide and chlorine, a membrane made of a fluorinated copolymer having carboxylic acid type functional groups or sulfonic acid type functional groups, has been known. The fluorinated copolymer is obtained by copolymerizing a fluorinated olefin with a fluorinated monomer having a carboxylic acid type functional group or a sulfonic acid type functional group (Patent Documents 1, 2 and 3).

In the alkali chloride electrolytic process employing an ion exchange membrane, it is important to suppress deterioration of the performance of the ion exchange membrane as far as possible so as to operate at a low cost. The deterioration of the performance of the ion exchange membrane is classified into a physical damage due to pinholes or deterioration of membrane, and a chemical damage due to e.g. a severe operating environment. A main component of the chemical damage may be deposition of impurities such as calcium or strontium in the ion exchange membrane.

Impurities in an aqueous alkali chloride solution are usually suppressed to be a low concentration by a purification step, but the quality of an alkali chloride to be used and a level of purification techniques vary depending on a user, and therefore such deposition of impurities in an ion exchange membrane frequently occurs among a lot of users, such being problematic.

If an ion exchange membrane is contaminated with impurities in an aqueous alkali chloride solution, the membrane resistance increases or current efficiency decreases. If the current efficiency decreases, there are considerable demerits such as an increase in running costs due to an increase of an electric power unit or an increase of the frequency of membrane exchange, and deterioration in quality of chlorine due to an increase of an oxygen concentration in chlorine. Accordingly, an ion exchange membrane with a small decrease in current efficiency due to impurities in an aqueous alkali chloride solution, has been desired.

For example, when a drop width of a current efficiency is lowered by 1%, it is possible to suppress the increase of the electric power unit by 1% in production of an alkali hydroxide or chlorine, and it is thereby effective to reduce about 20,000,000 JPY for the cost of electricity in one year in the case of e.g. a plant to produce sodium hydroxide in an amount of 200,000 tons in one year. Further, in consideration of benefits such as a decrease in running cost due to extension of membrane life span or stabilization of electrolytic operation, it is crucially more important than suppression of an increase in electricity cost.

An ion exchange membrane is usually a laminate having a layer made of a fluorinated copolymer having sulfonic acid type functional groups, which can maintain strength, and a layer made of a fluorinated copolymer having carboxylic acid type functional groups, as a functional layer to develop high current efficiency. Since it has been known that the decrease in current efficiency by impurities occurs when the impurities are deposited on the layer made of a fluorinated copolymer having carboxylic acid type functional groups, it is essential to improve the layer made of a fluorinated copolymer having carboxylic acid type functional groups, for improving the current efficiency.

PRIOR ART DOCUMENTS

Patent Documents

Patent Document 1: JP-A-07-118332
Patent Document 2: WO2009/133902
Patent Document 3: JP-A-2005-82748

DISCLOSURE OF INVENTION

Technical Problem

The object of the present invention is to provide a fluorinated copolymer which is capable of providing an ion exchange membrane which can suppress a decrease in current efficiency by impurities in an aqueous alkali chloride solution, and an ion exchange membrane which can suppress a decrease in current efficiency by impurities in an aqueous alkali chloride solution.

Solution to Problem

The present inventors have conducted extensive studies, and as a result, have found that low molecular weight components contained in a fluorinated copolymer having carboxylic acid type functional groups have a great effect on deterioration in membrane performance by impurities in an aqueous alkali chloride solution.

Specifically, as the proportion of the low molecular weight components contained in a fluorinated copolymer having carboxylic acid type functional groups becomes small, the durability to impurities in an aqueous alkali chloride solution becomes strong, and a decrease in current efficiency becomes small.

That is, the fluorinated copolymer of the present invention is a fluorinated copolymer of a fluorinated monomer having a carboxylic acid type functional group with a fluorinated olefin, wherein the proportion of components having a common logarithm (log M) of a molecular weight M being from 2.0 to 3.5 is at most 10 mass % per 100 mass % of components having a common logarithm (log M) of a molecular weight M being at least 2.0, contained in a soluble content obtained by the following extraction method:

(Extraction Method)

A powdery fluorinated copolymer is mixed with $CClF_2CF_2CClFH$ with a mass ten times the fluorinated copolymer. A resulting mixture is stirred at 65° C. for 5 or more hours. The mixture is cooled to room temperature, and then methanol with a mass twice the fluorinated copolymer is added to the mixture. The mixture is filtrated, and $CClF_2CF_2CClFH$ and methanol are distilled off from a filtrate to obtain a soluble content.

The fluorinated copolymer of the present invention preferably has an ion exchange capacity of from 0.8 to 1.3 meq/g dry resin.

The fluorinated monomer having a carboxylic acid type functional group is preferably represented by the following formula (1):

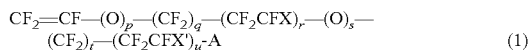

$$CF_2=CF-(O)_p-(CF_2)_q-(CF_2CFX)_r-(O)_s- (CF_2)_t-(CF_2CFX')_u-A \quad (1)$$

wherein X is a fluorine atom or a trifluoromethyl group, X' is a fluorine atom or a trifluoromethyl group, A is a carboxylic acid type functional group, p is 0 or 1, q is an integer of from 0 to 12, r is an integer of from 0 to 3, s is 0 or 1, t is an integer of from 0 to 12, u is an integer of from 0 to 3, 1≤p+s, and 1≤r+u.

The ion exchange membrane of the present invention comprises the fluorinated copolymer of the present invention.

The ion exchange membrane of the present invention is preferably a laminate having a layer containing the fluorinated copolymer of the present invention and a layer containing a fluorinated copolymer having sulfonic acid type functional groups.

Advantageous Effects of Invention

According to the fluorinated copolymer of the present invention, it is possible to obtain an ion exchange membrane which can suppress a decrease in current efficiency due to impurities in an aqueous alkali chloride solution.

The ion exchange membrane of the present invention can suppress a decrease in current efficiency due to impurities in an aqueous alkali chloride solution.

BRIEF DESCRIPTION OF DRAWING

FIG. 1 is a graph illustrating a molecular weight distribution of a $CClF_2CF_2CClFH$ soluble content extracted from a fluorinated copolymer in each of Examples 1 to 4.

DESCRIPTION OF EMBODIMENTS

<Fluorinated Copolymer>

The fluorinated copolymer of the present invention is a fluorinated copolymer of a fluorinated monomer having a carboxylic acid type functional group with a fluorinated olefin, wherein the proportion of components having a common logarithm (log M) of a molecular weight M being from 2.0 to 3.5 is at most 10 mass % per 100 mass % of components having a common logarithm (log M) of a molecular weight M being at least 2.0, contained in a soluble content obtained by an extraction method as mentioned below.

(Fluorinated Monomer having Carboxylic Acid Type Functional Group)

The fluorinated monomer having a carboxylic acid type functional group is not particularly limited so long as it is a monomer having at least one fluorine atom and having a carboxylic acid type functional group in its molecule, and a conventional compound may be used.

The fluorinated monomer having a carboxylic acid type functional group is preferably a perfluorovinyl ether represented by the following formula (1) from the viewpoint of industrial productivity.

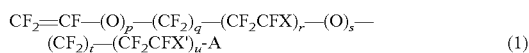

$$CF_2=CF-(O)_p-(CF_2)_q-(CF_2CFX)_r-(O)_s- (CF_2)_t-(CF_2CFX')_u-A \quad (1)$$

In the formula (1), X is a fluorine atom or a trifluoromethyl group, X' is a fluorine atom or a trifluoromethyl group, and in a case where both of X and X' are present in one molecule, they may be the same or different.

"A" is a carboxylic acid type functional group. The carboxylic acid type functional group is a carboxylic acid group (—COOH) itself or a functional group capable of being converted to a carboxylic acid group by hydrolysis or neutralization. The functional group capable of being converted to a carboxylic acid group may, for example, be —CN, —COF, —COOR$^1$ (wherein R$^1$ is a $C_{1-10}$ alkyl group), —COOM (wherein M is an alkali metal or a quaternary ammonium salt group) or —COONR$^2$R$^3$ (wherein each of R$^2$ and R$^3$ is a hydrogen atom or a $C_{1-10}$ alkyl group, and R$^2$ and R$^3$ may be the same or different).

p is 0 or 1, q is an integer of from 0 to 12, r is an integer of from 0 to 3, s is 0 or 1, t is an integer of from 0 to 12, and u is an integer of from 0 to 3, provided that p and s, and r and u, are not simultaneously 0. That is, 1≤p+s and 1≤r+u are satisfied.

As a specific example of the perfluorovinyl ether represented by the formula (1), the following compounds are mentioned, and among them, compounds wherein p=1, q=0, r=1, s=0 to 1, t=1 to 3 and u=0 to 1 are preferred, in view of easiness of preparation.

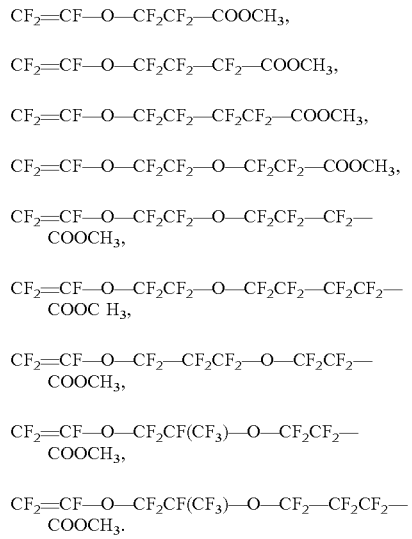

(Fluorinated Olefin)

As the fluorinated olefin, a fluoroolefin having 2 to 3 carbon atoms and having at least one fluorine atom in its molecule is used. As a fluoroolefin, tetrafluoroethylene ($CF_2=CF_2$) (hereinafter, referred to as "TFE"), chlorotrifluoroethylene ($CF_2=CFCl$), vinylidene fluoride ($CF_2=CH_2$), a vinyl fluoride ($CH_2=CHF$) or hexafluoropropylene ($CF_2=CFCF_3$) may, for example, be mentioned. In terms of chemical stability and strength of an ion exchange membrane, TFE is particularly preferred. Such fluorinated olefins may be used alone or in combination of two or more.

(Other Monomer)

In the present invention, in addition to the fluorinated monomer having a carboxylic acid type functional group and the fluorinated olefin, other monomer may further be copolymerized. Such other monomer may, for example, be $CF_2=CF_2-R^f$ or $CF_2=CF-OR^f$ (in such formulae, $R^f$ is a $C_{1-10}$ perfluoroalkyl group), or $CF_2=CFO(CF_2)_vCF=CF_2$ (wherein v is an integer of from 1 to 3). By copolymerizing such other monomer, the flexibility and the mechanical strength of an ion exchange membrane can be improved. The proportion of such other monomer is preferably at most 30 mass %, in the total monomers (100%) with a view to maintaining the ion exchange performance.
($CClF_2CF_2CClFH$ Soluble Content)

In the fluorinated copolymer of the present invention, the proportion of components having a common logarithm (log M) of a molecular weight M being from 2.0 to 3.5 is at most 10 mass %, preferably at most 5 mass %, more preferably at most 3 mass %, per 100 mass % of components having a common logarithm (log M) of a molecular weight M being at least 2.0, contained in a soluble content (hereinafter, referred to as $CClF_2CF_2CClFH$ soluble content) obtained by the following extraction method. When the proportion of the components having log M being from 2.0 to 3.5 is at most 10 mass % per 100 mass % of components having log M being at least 2.0, contained in the $CClF_2CF_2CClFH$ soluble content, it is possible to obtain an ion exchange membrane which can suppress a decrease in current efficiency by impurities in an aqueous alkali chloride solution.
(Extraction Method)

A powdery fluorinated copolymer is mixed with $CClF_2CF_2CClFH$ with a mass ten times the fluorinated copolymer. A resulting mixture is stirred at 65° C. for 5 or more hours. The mixture is cooled to room temperature, and then methanol with a mass twice the fluorinated copolymer is added to the mixture. The mixture is filtrated, and $CClF_2CF_2CClFH$ and methanol are distilled off from a filtrate to obtain a soluble content.
(Calculation Method of Proportion of Low Molecular Weight Component)

The proportion of components having log M being from 2.0 to 3.5 per 100 mass % of components having log M being at least 2.0 is calculated as follows.

Regarding $CClF_2CF_2CClFH$ soluble content, a molecular weight distribution is prepared by plotting log M on the horizontal axis and a differential distribution value on the vertical axis as shown in FIG. 1, by means of gel permeation chromatography (hereinafter referred to as "GPC"). In the molecular weight distribution, a differential distribution value in a range where log M is from 2.0 to 3.5 is integrated (by calculating an integrated value of log M being from 2.0 to 3.5), and a proportion to an integrated value (an integrated value in the entire range of log M being at least 2.0) of a differential distribution value in the entire range of log M being at least 2.0. Here, the range of log M being less than 2.0 is excluded since, in the range of log M being less than 2.0, GPC measurement is adversely influenced by a remaining solvent or a noise, and reproducibility of the measurement cannot be expected in such a range, and further substantially no low molecular weight component having log M being less than 2.0 in the fluorinated copolymer is present.
(Ion Exchange Capacity)

When the fluorinated copolymer of the present invention is used for an ion exchange membrane, the ion exchange capacity of the fluorinated copolymer is preferably from 0.5 to 2.0 meq/g dry resin. Even when the ion exchange capacity of the fluorinated copolymer is increased, the molecular weight of the fluorinated copolymer can be increased, and accordingly mechanical properties and the durability of the fluorinated copolymer will not be decreased.

The ion exchange capacity of the fluorinated copolymer of the present invention is preferably at least 0.6 meq/g dry resin, more preferably at least 0.7 meq/g dry resin, furthermore preferably at least 0.8 meq/g dry resin, particularly preferably at least 0.9 meq/g dry resin, from the viewpoint of mechanical properties and current efficiency as an ion exchange membrane. When the ion exchange capacity is at least 0.6 meq/g dry resin, the water content is appropriately high, and the ion exchange groups can sufficiently be ionized, whereby the anions can sufficiently be excluded, thus leading to a high current efficiency.

The ion exchange capacity of the fluorinated copolymer of the present invention is preferably at most 1.3 meq/g dry resin, more preferably at most 1.2 meq/g dry resin in view of the current efficiency as an ion exchange membrane or a quality of alkali hydroxide produced by an alkali chloride electrolytic process. When the ion exchange capacity is at most 1.3 meq/g dry resin, the water content is appropriately low, and the ion exchange group concentration in the ion exchange membrane is appropriately high, whereby the anions can sufficiently be excluded, thus leading to a high current efficiency.
(Molecular Weight)

The molecular weight of the fluorinated copolymer relates to the mechanical performance as an ion exchange membrane and film formation properties. The molecular weight of the fluorinated copolymer of the present invention is preferably at least 150° C., more preferably from 170 to 340° C., furthermore preferably from 170 to 300° C. by the TQ value.

The TQ value is a value relating to the molecular weight of a polymer, and is represented by the temperature at which the volume flow rate becomes 100 $mm^3$/sec.
<Process for Producing Fluorinated Copolymer>

The fluorinated copolymer of the present invention can be produced by e.g. a process comprising the following steps (I) to (III):

(I) a step of obtaining a fluorinated copolymer by polymerizing a fluorinated monomer having a carboxylic acid type functional group, a fluorinated olefin, and as the case requires, another monomer, (II) a step of separating the fluorinated copolymer from a polymerization medium and an unreacted monomer, and (III) a step of washing the fluorinated copolymer with a washing solvent.
(Step (I))

As the polymerization method, a bulk polymerization method, a solution polymerization method, an emulsion polymerization method or a suspension polymerization method may, for example, be mentioned, and a solution polymerization method is preferred from the viewpoint that the molecular weight distribution becomes small.

The polymerization medium in the solution polymerization method may, for example, be hydrochlorofluorocarbon, hydrofluorocarbon, hydrofluoroether, hydrocarbon, chlorocarbon or an alcohol.

The polymerization medium in the suspension polymerization method may be a medium containing at least one of e.g. hydrochlorofluorocabon, hydrofluorocarbon, hydrofluoroether, chlorocarbon and hydrocarbon having water added thereto.

The polymerization medium in the emulsion polymerization method may be water, and the same polymerization medium as the polymerization medium used in a solution polymerization method may be used in combination.

The molecular weight of the fluorinated copolymer obtainable is low when the amount of a chain transfer component present in the polymerization system is large, and is high if the amount is small. As described above, the fluorinated copolymer of the present invention preferably has a certain molecular weight in view of mechanical performance and membrane formation properties as an ion exchange membrane. By using the above polymerization medium, the chain transfer properties of the polymerization medium itself are low, whereby a fluorinated copolymer having a sufficiently high molecular weight can be obtained.

The polymerization pressure is preferably at least 0.05 MPaG (gauge pressure). If the pressure is too low, it will be difficult to maintain the polymerization reaction rate to a practically satisfiable rate, whereby a high molecular weight fluorinated copolymer is hardly obtained. Further, the polymerization pressure is preferably at most 2.0 MPaG.

Conditions other than the polymerization pressure and operation are not particularly limited, and a wide range of reaction conditions can be employed. For example, as the temperature for polymerization, an optimum value is selected depending on the types of the monomer, the reaction molar ratio, etc. However, a reaction at a too high temperature or a too low temperature is industrially disadvantageous, and accordingly it is preferred to select the reaction temperature of from 20 to 90° C., more preferably from 30 to 80° C.

It is possible to initiate the polymerization by irradiation with ionizing radiation, but use of a polymerization initiator having high activity at the above-described preferred reaction temperature (20 to 90° C.) such as an azo compound or a peroxy compound is industrially advantageous.

The amount of addition of such a polymerization initiator is preferably from 0.0001 to 3 parts by mass, more preferably from 0.0001 to 2 parts by mass per 100 parts by mass of the monomers. By reducing the amount of addition of the polymerization initiator, the molecular weight of the fluorinated copolymer can be increased. In addition to the polymerization initiator, a molecular weight adjuster or the like to be used in a conventional solution polymerization method may be added.

The proportions of a fluorinated monomer having a carboxylic acid type functional group and a fluorinated olefin charged are selected so that the proportion of the monomer units in the fluorinated copolymer obtained is a desired proportion. The proportion of a fluorinated monomer having a carboxylic acid type functional group charged is selected so that the proportion of the fluorinated monomer units having a carboxylic acid type functional group in the fluorinated copolymer is preferably from 15 to 95 mass %, more preferably from 20 to 80 mass %, furthermore preferably from 20 to 60 mass %.

The respective monomers may be added all at once, or may be added successively or continuously. With a view to making the concentration of the monomers in the reaction system constant so as to make the composition of a fluorinated copolymer to be formed uniform, it is preferred to successively add the fluorinated olefin and the fluorinated monomer having a carboxylic acid type functional group to the polymerization system containing the hydrofluorocarbon as the polymerization medium for continuous reaction.

The successive addition may be carried out by changing the addition ratio of the respective monomers between at the initial stage of the polymerization and at the later stage of the polymerization, or by making up for the respective fluoromonomers consumed by the polymerization so as to maintain the concentration of the respective monomers in the polymerization system constant, but with a view to making the composition of the fluorinated copolymer to be obtained uniform, the latter is preferred. Specifically, it is preferred to successively introduce the fluorinated olefin to maintain the polymerization pressure constant and to successively add the fluorinated monomer having a carboxylic acid type functional group in proportion to the amount of the fluorinated olefin introduced.

Even in polymerization in the uniform polymerization system such as solution polymerization, the monomer is consumed by the reaction and the monomer concentration is decreased, and accordingly the ion exchange capacity is gradually decreased as the reaction proceeds, resulting in distribution of the composition of the fluorinated copolymer. However, by successively or continuously adding the respective monomers to carry out reaction while the concentrations of the monomers are controlled constant, the distribution of the composition in the obtained fluorinated copolymer, i.e. the distribution of the ion exchange capacity can be reduced.

It has been known that when the ion exchange capacity distribution in the fluorinated copolymer is smaller, the initial current efficiency is achieved even with a high ion exchange capacity, and a decrease in e.g. the current efficiency by impurities such as iodine is reduced. When the ion exchange capacity distribution in the fluorinated copolymer having carboxylic acid type functional groups is smaller, a decrease in current efficiency by impurities can be suppressed. The reason is such that when the ion exchange capacity distribution is small, the distribution of the water content of the fluorinated copolymer is also small, and accordingly components having a water content higher than the optimum water content range are small even if the ion exchange capacity is high, whereby the initial current efficiency is high, and further, as the ion exchange capacity can be made high, components having a water content lower than the optimum water content range are small even if the water content is decreased by deposition of impurities, whereby a decrease in the current efficiency can be suppressed.

(Step (II))

After the step (I), a gaseous unreacted monomer is discharged (purged) from the polymerization system, then agglomeration, extraction, filtration, distillation, heating and the like are carried out, and a polymerization medium and a liquid unreacted monomer are separated to obtain a fluorinated copolymer.

(Step (III))

The form of the fluorinated copolymer used in the step (III) may be a powder or pellets. Further, it may be in a completely dried state or in a state containing a solvent. When pellets are used, the filterability is excellent, and when a powder is used, the washing property is excellent. In the present invention, a dried powder is preferred since the washing property is important.

The washing solvent to be used in the step (III) contains at least a fluorinated solvent. The fluorinated solvent may, for example, be hydrochlorofluorocarbon, hydrofluorocarbon, perfluorocarbon, perfluoroether or hydrofluoroether. Hydrochlorofluorocarbon, hydrofluorocarbon or hydrofluoroether is preferred, and hydrofluorocarbon or hydrofluoroether with no ozone depletion potential is more preferred. Further, the fluorinated solvent may be used alone, two or more fluorinated solvents may be used in combination, or the fluorinated solvent and other solvents may be used in combination.

The amount of the washing solvent is preferably from 1 to 100 times mass, more preferably from 3 to 50 times mass the fluorinated copolymer. If the amount of the washing solvent is small, washing cannot sufficiently be carried out, and if the amount of the washing solvent is large, it takes a time to carry out treatment after the washing. Further, the number of washing has a relation with the amount of the washing solvent, and when the amount of the washing solvent is large, the washing may be once, and if the amount of the washing solvent is small, the number of washing increases.

The washing temperature is preferably from room temperature to 150° C. If the washing temperature is too low, the extraction amount of the low-molecular weight component becomes small, and if it exceeds 150° C., the fluorinated copolymer begins to decompose. The washing temperature is more preferably at least 40° C. from the viewpoint that a low-molecular weight components having a relatively large molecular weight can sufficiently be dissolved by heating. Further, the washing temperature is more preferably at most a boiling point of the washing solvent under normal pressure from the viewpoint that no specific pressure vessel is required and a fluorinated copolymer can be obtained at a low cost.

The washing may be carried out under normal pressure or in a pressurized state in a pressure vessel.

The washing time is preferably from 15 minutes to 16 hours, more preferably from 30 minutes to 8 hours. When the washing temperature is high, the washing time is shortened.

The separating treatment subsequent to the washing may be carried out at the same heating temperature as in the above washing treatment, or it may be carried out after cooled. Further, it may be filtrated as it is after washed, or it may be filtrated after a poor solvent is added to carry out precipitation. Furthermore, other methods such as centrifugation may be employed other than the filtration.

The step (III) may include another step. Such another step may, for example, be re-esterification. The fluorinated copolymer having carboxylic acid type functional groups obtained by the polymerization reaction is easily hydrolyzed with water, and there may be a drawback in carrying out melt processing in some cases, and therefore at the time of washing with a fluorinated solvent, re-esterification may be carried out at the same time with the washing, by using trimethyl orthoformate or trimethyl orthoacetate. On that occasion, an acidic catalyst such as sulfuric acid may be used.

The amount of the low-molecular weight components to be removed by the washing is preferably from 1 to 10 mass % per 100 mass % of the fluorinated copolymer before the washing. If the amount of the low-molecular weight components to be removed is less than 1 mass %, an effect of suppressing a decrease in the current efficiency by impurities will be insufficient, and if it exceeds 10 mass %, the yield of the expensive fluorinated copolymer will decrease, such being economically unfavorable.

In the fluorinated copolymer of the present invention, the proportion of components having log M being from 2.0 to 3.5 is at most 10 mass % per 100 mass % of components having log M being at least 2.0, contained in a $CClF_2CF_2CClFH$ soluble content, and therefore it is possible to obtain an ion exchange membrane which can suppress a decrease in current efficiency by impurities in an aqueous alkali chloride solution. This reason is not clearly understood at this time, but it is presumed as follows.

A low-molecular weight component having log M being at most 3.5 has a low molecular cohesion, and therefore the solubility in water or an aqueous alkali solution is high. If the low-molecular weight component is contained, the low-molecular weight component is eluted from the inside of an ion exchange membrane in the film-forming step and in the initial stage of an electrolytic operation, whereby physical spaces which look like extremely minute voids are formed in the ion exchange membrane. If impurity ions enter into the ion exchange membrane, hydroxides of impurity ions tend to deposit in the spaces, whereby a damage imparted to the fluorinated copolymer is considered to be considerable.

There are a number of documents relating to an ion exchange membrane used for an alkali chloride electrolytic process, but there are no disclosure of a method of removing low-molecular weight components in a fluorinated copolymer. Further, Patent Document 1 discloses that solvent extraction is carried out by using a fluorinated solvent in a step of producing a fluorinated copolymer, but the solvent extraction is carried out at room temperature, and its main purpose is to recover an unreacted monomer from an aqueous phase, and therefore low-molecular weight components are hardly removed from the fluorinated copolymer. Even if the low-molecular weight components are removed, their amount is small, and therefore it is impossible to expect the effect of suppressing a decrease in current efficiency by impurities. Patent Document 2 discloses that a fluorinated copolymer is washed with methanol, but low-molecular weight components can hardly be removed from the fluorinated copolymer by the washing with methanol. Patent Document 3 discloses that a fluorinated copolymer is washed with ethanol heated, but low-molecular weight components can hardly be removed from the fluorinated copolymer by the washing with ethanol even if the ethanol is heated.

<Ion Exchange Membrane>

The ion exchange membrane of the present invention is one containing the fluorinated copolymer of the present invention. The ion exchange membrane of the present invention can be obtained by forming the fluorinated copolymer of the present invention into a membrane. The process for producing an ion exchange membrane comprises a step of forming the fluorinated copolymer into a membrane, and a step of converting carboxylic acid type functional groups in the fluorinated copolymer to carboxylic acids by hydrolysis. Either of the above step of membrane formation and a step of conversion may be carried out first, but it is preferred that the conversion step is carried out after the step of membrane formation.

The ion exchange membrane of the present invention may be a laminate having a plurality of layers containing the fluorinated copolymer of the present invention, wherein each layer has a different ion exchange capacity in the fluorinated copolymer; a laminate having a layer containing the fluorinated copolymer of the present invention and a layer containing a fluorinated copolymer having sulfonic acid type functional groups; or a laminate having a reinforcing material.

The sulfonic acid type functional group is a sulfonic acid group ($-SO_3H$) itself or a functional group capable of being converted to a sulfonic acid group by hydrolysis or neutralization. The functional group capable of being converted to a sulfonic acid group may, for example, be $-SO_3M$, $-SO_2F$, $-SO_2Cl$ or $-SO_2Br$.

The reinforcing material may, for example, be woven fabric (cloth), fiber or nonwoven fabric.

The ion exchange membrane of the present invention can be used for alkali chloride electrolysis, diffusion dialysis, ozone-generating electrolysis, electrolytic reduction, a diaphragm for a fuel cell, a polymer catalyst, etc. Particularly, it is suitable for alkali chloride electrolysis by e.g. sodium chloride.

The ion exchange membrane of the present invention contains the fluorinated copolymer of the present invention, and therefore it is possible to suppress a decrease in current efficiency by impurities in an aqueous alkali chloride solution.

EXAMPLES

Now, the present invention will be described, but it should be understood that the present invention is by no means restricted to the following Examples.

Examples 1 and 2 are Examples of the present invention, and Examples 3 to 5 are Comparative Examples.
(TQ value)

TQ value is a value relating to the molecular weight of a polymer and is represented by the temperature at which the volume flow rate becomes 100 mm³/sec. The volume flow rate is an extruded amount represented by the unit of mm³/sec when a fluorinated copolymer is melt-extruded from an orifice (diameter: 1 mm, length: 1 mm) at a constant temperature under a pressure of 3 MPaG using a Shimadzu flow tester CFD-100D (manufactured by Shimadzu Corporation).
(Ion Exchange Capacity)

About 0.5 g of a fluorinated copolymer was pressed at a temperature higher than TQ by about 10° C. by flat plate pressing to be formed into a film, analyzed by means of a transmission infrared spectrometer, and an ion exchange capacity was calculated from the height of each peak of a $CF_2$ peak, a $CF_3$ peak and an OH peak of a resulting spectrum.
(Extraction Method)

A powdery fluorinated copolymer obtained by distilling off a solvent by heating under reduced pressure, was vacuum-dried at 80° C. for 12 hours, followed by mechanical sieving in accordance with JIS-Z8815 by using 1001 stainless-made testing sieves (JIS-Z8801) with openings of 2.0 mm and 2.8 mm to obtain 25 g of a powder of a fluorinated copolymer with a particle size of from 2.0 mm to 2.8 mm.

10 g of the powder of a fluorinated copolymer with a particle size of from 2.0 mm to 2.8 mm obtained was mixed with $CClF_2CF_2CClFH$ (hereinafter referred to as AK-225cb) with a mass ten times the powder of the fluorinated copolymer. A resulting mixture was stirred at 65° C. for 5 or more hours, cooled to room temperature, and methanol with a mass twice the fluorinated copolymer was added to the mixture. The mixture was filtrated under reduced pressure by using a membrane filter with 10 μm-pores, and AK-225cb and methanol were distilled off from a filtrate by using a rotary evaporator to obtain an AK-225cb soluble content.
(Calculation Method of Proportion of Low-Molecular Weight Component)

The proportion of components having log M being from 2.0 to 3.5 per components having log M being at least 2.0, was calculated as follows.

Regarding the AK-225cb soluble content, a molecular weight calculated as polymethyl methacrylate was determined under the following conditions. Here, regarding AK-225cb soluble content extracted by the above extraction method, the maximum value of the molecular weight as calculated as polymethyl methacrylate is about 100,000.

GPC apparatus: High performance GPC apparatus HLC-8220GPC, manufactured by TOSOH CORPORATION.

Detector: Evaporative light scattering detector ELSD-LT, manufactured by Shimadzu Corporation.

GPC column: PLgel MIXED-C, manufactured by Polymer Laboratories K.K.

Sample concentration: 1.5 w/v %

Solvent: AK-225G/hexafluoroisopropanol (99/1 (v/v))

Measurement temperature: 37° C.

Flow rate: 1.0 mL/min

Standard: Polymethyl methacrylate standard

A molecular weight distribution was prepared by plotting log M on the horizontal axis and a differential distribution value on the vertical axis as shown in FIG. 1. In the molecular weight distribution, a differential distribution value in a range where log M is from 2.0 to 3.5 was integrated (by calculating an integrated value of log M being from 2.0 to 3.5), and a proportion to an integrated value (an integrated value in the entire range of log M being at least 2.0) of a differential distribution value in the entire range of log M being at least 2.0, was calculated.
(Preparation of Ion Exchange Membrane)

A fluorinated copolymer (ion exchange capacity: 110 meq/g dry resin, TQ: 235° C.) (hereinafter referred to as polymer S) of TFE with a perfluorovinyl ether compound having a sulfonic acid type functional group represented by the following formula (2-1) was prepared.

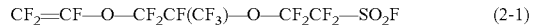

$$CF_2=CF-O-CF_2CF(CF_3)-O-CF_2CF_2-SO_2F \quad (2\text{-}1)$$

A fluorinated copolymer (hereinafter referred to as polymer C) having carboxylic acid type functional groups, obtained in the after-mentioned Examples 1 to 5, and polymer S were subjected to coextrusion to obtain film A of a two layer structure comprising a layer of polymer C (thickness: 18 μm) and a layer of polymer S (thickness of 65 μm). Further, polymer S was subjected to melt-extrusion to obtain film B (thickness: 30 μm).

Monofilament polytetrafluoroethylene (hereinafter referred to as PTFE) yarns obtained by rapidly stretching a PTFE film, followed by slitting into 100 denier, and multi-filament polyethylene terephthalate (hereinafter referred to as PET) yarns obtained by drawing and twisting six PET filaments of 5 denier, were subjected to plain weaving in an alternating arrangement of two PET yarns to one PTFE yarn, to obtain a reinforcing woven fabric (yarn density: 30 yarns/cm). This woven fabric was flattened by a roll press so that the thickness of the woven fabric became about 80 μm.

The woven fabric and film thus obtained were overlaid in the order of film B, the woven fabric, film A and a releasing PET film (thickness: 100 μm), so that the layer of polymer C of film A would be on the releasing PET film side, and they were laminated by means of rollers. Then, the releasing PET film was peeled to obtain a reinforced laminated membrane.

A paste comprising 29.0 mass % of zirconium oxide (average particle size: 1 μm), 1.3 mass % of methyl cellulose, 4.6 mass % of cyclohexanol, 1.5 mass % of cyclohexane, and 63.6 mass % of water, was transferred by a roll press on the film B side of the laminated membrane to attach a gas-releasing covering layer. The attached amount of zirconium oxide was 20 g/m².

The laminated membrane provided with a gas-releasing covering layer was immersed in an aqueous solution containing 5 mass % of dimethylsulfoxide and 30 mass % of potassium hydroxide at 95° C. for 10 minutes, and —COOCH₃ groups in polymer C and —SO₂F groups in polymer S were hydrolyzed to be converted to ion exchange groups.

A dispersion having 13 mass % of zirconium oxide (average particle size: 1 μm) dispersed in an ethanol solution containing 2.5 mass % of an acid-form polymer of polymer S, was prepared, and this dispersion was sprayed to the film A side of the laminated membrane after hydrolysis to attach a gas-releasing covering layer, whereby an ion exchange membrane was obtained. The attached amount of zirconium oxide was 3 g/m².

(Evaluation of Ion Exchange Membrane)

The ion exchange membrane thus obtained was disposed in an electrolytic cell so that film A faced the cathode, and electrolysis of a sodium chloride aqueous solution was carried out.

An electrolytic cell (effective current-carrying area: 25 cm²) was employed, wherein the inlet of water to be supplied to the cathode compartment was disposed at a lower part of the cathode compartment, and the outlet of the formed sodium hydroxide aqueous solution was disposed at an upper part of the cathode compartment, the inlet of a sodium chloride aqueous solution to the anode compartment was disposed at a lower part of the anode compartment, and the outlet of the sodium chloride aqueous solution diluted by the electrolytic reaction was disposed at an upper part of the anode compartment.

As the anode, one having a titanium punched metal (short diameter: 4 mm, long diameter: 8 mm) coated with a solid solution of ruthenium oxide, iridium oxide and titanium oxide, was used.

As the cathode, one having ruthenium-containing Raney Nickel electrically deposited on a SUS304 punched metal (short diameter: 5 mm, long diameter: 10 mm) was used.

The electrolysis of the sodium chloride aqueous solution was carried out as follows. The electrolysis was carried out for one week by bringing the cathode side in a pressurized state so that the anode and the ion exchange membrane would be in contact with each other, while supplying a 290 g/L sodium chloride aqueous solution and water to the anode compartment and the cathode compartment, respectively, and maintaining the concentration of sodium chloride discharged from the anode compartment to be 190 g/L and the concentration of sodium hydroxide discharged from the cathode compartment to be 32 mass %, under such conditions that the temperature would be 85° C. and the current density was 6 kA/m².

Then, the concentration of sodium chloride discharged from the anode compartment was changed to 230 g/L, and the concentration of sodium hydroxide discharged from the cathode compartment was changed to 33 mass %, and the current efficiency was measured (current efficiency before adding Ca/Sr). Then, the sodium chloride aqueous solution to be supplied was changed to a 290 g/L sodium chloride aqueous solution containing 0.5 ppm of calcium ions and 1 ppm of strontium ions, and the electrolysis was further carried out for 4 hours. Then it was again changed to a 290 g/L sodium chloride aqueous solution, the electrolysis was further carried out for 20 hours, and the current efficiency after adding calcium and strontium was measured (current efficiency after adding Ca/Sr).

Example 1

(Step (I))

A stainless steel reactor (autoclave) having an internal capacity of 1.25 L was evacuated of air, and in the reactor, 483 g of $CF_3CF_2CF_2CF_2CF_2CHF_2$ (hereinafter referred to as C6H) as a polymerization medium and 290 g of perfluorovinyl ether compound having a carboxylic acid type functional group represented by the following formula (1-1) were sucked and injected.

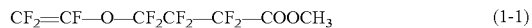

$$CF_2=CF-O-CF_2CF_2-CF_2-COOCH_3 \quad (1\text{-}1)$$

TFE was introduced to the reactor until the pressure in the reactor became 0.1 MPaG (gauge pressure), and the reactor was heated so that the temperature in the reactor became 67° C. After the temperature in the reactor was stabilized at 67° C., TFE was further introduced until the pressure became 1.11 MPaG, and further 113 g of a C6H solution containing 0.36 mass % of azobisisobutyronitrile as a polymerization initiator was injected and added in the reactor to initiate the reaction. During the reaction, TFE was continuously introduced so as to maintain the pressure to be 1.11 MPaG. Further, to 10 g of TFE introduced, 4.7 g of the perfluorovinyl ether compound represented by the formula (1-1) was continuously added.

(Step (II))

When the amount of introduction of TFE from the initiation of the reaction reached 49 g, unreacted TFE was discharged out of the system to complete the polymerization. Thereafter, while heating under reduced pressure, a solvent and an unreacted monomer in a liquid form were distilled off to obtain 54 g of a powdery copolymer. (Step (III))

162 g of $CF_3CH_2CF_2CH_3$ (hereinafter referred to as HFC-365 mfc) was charged thereto, the reactor was set to 45° C., and reflux for 5 hours under normal pressure was carried out, and cooled to carry out filtration. The same operation was carried out 5 times, 162 g of methanol and 16.2 g of trimethyl orthoacetate were charged thereto, and while the reactor was set to 65° C., reflux was carried out for 15 hours, followed by cooling and filtration, and trimethyl orthoacetate was washed with methanol, followed by drying to obtain a powdery fluorinated copolymer.

Of the obtained fluorinated copolymer, the ion exchange capacity was 1.065 meq/g dry resin, and the TQ value was 226° C. Further, a molecular weight of AK-225cb soluble content in the fluorinated copolymer was measured, and the proportion of components having log M being from 2.0 to 3.5 was 2.1 mass % per 100 mass % of components having log M being at least 2.0, contained in the soluble content. The molecular weight distribution is shown in FIG. 1.

Further, by using the fluorinated copolymer obtained, an ion exchange membrane was prepared and evaluated, whereupon the current efficiency before adding Ca/Sr was 96.7%, and the current efficiency after adding Ca/Sr was 94.9%. That is, the decrease in current efficiency due to contamination by calcium ions and strontium ions was 1.8%.

Example 2

(Steps (I) and (II))

54 g of a powdery copolymer was obtained in the same manner as in Example 1.

(Step (III))

270 g of $CF_2HCF_2OCH_2CF_3$ (hereinafter referred to as HFE-347pc-f) and 1.08 g of trimethyl orthoacetate were charged thereto, the reactor was set to 60° C., and reflux was carried out for 1 hour under normal pressure, followed by cooling and filtration. Thereafter, 810 g of HFE-347pc-f was charged, the reactor was set to 60° C., reflux was carried out for 1 hour under normal pressure, followed by cooling and filtration, followed by drying to obtain a powdery fluorinated copolymer.

Of the fluorinated copolymer obtained, the ion exchange capacity was 1.062 meq/g dry resin, and the TQ value was 239° C. Further, the molecular weight of the AK-225cb soluble content in the fluorinated copolymer was measured, whereupon the proportion of components having log M being from 2.0 to 3.5 was 0.6 mass % per 100 mass % of components having log M being at least 2.0, contained in the soluble content. The molecular weight distribution is shown in FIG. 1.

Further, by using the fluorinated copolymer obtained, an ion exchange membrane was prepared and evaluated, whereupon the current efficiency before adding Ca/Sr was 96.7%, and the current efficiency after adding Ca/Sr was 94.9%. That is, the decrease in current efficiency due to contamination by calcium ions and strontium ions was 1.8%.

Example 3

(Steps (I) and (II))

54 g of a powdery copolymer was obtained in the same manner as in Example 1.

(Step (III))

270 g of methanol was charged thereto, the reactor was set to 65° C., and reflux was carried out for 5 hours under normal pressure, followed by cooling and filtration. The same operation was carried out four times, 162 g of methanol and 16.2 g of trimethyl orthoacetate were charged thereto, the reactor was set to 65° C., reflux was carried out for 15 hours, followed by cooling and filtration, and trimethyl orthoacetate was washed with methanol, followed by drying to obtain a powdery fluorinated copolymer.

Of the fluorinated copolymer obtained, the ion exchange capacity was 1.065 meq/g dry resin, and the TQ value was 230° C. Further, the molecular weight of the AK-225cb soluble content in the fluorinated copolymer was measured, whereupon the proportion of components having log M being from 2.0 to 3.5 was 42.7 mass % per 100 mass % of components having log M being at least 2.0, contained in the soluble content. The molecular weight distribution is shown in FIG. 1.

Further, by using the fluorinated copolymer obtained, an ion exchange membrane was prepared and evaluated, whereupon the current efficiency before adding Ca/Sr was 97.0%, and the current efficiency after adding Ca/Sr was 93.9%. That is, the decrease in the current efficiency due to contamination by calcium ions and strontium ions was 3.1%.

Example 4

(Step (I))

Polymerization was carried out in the same manner as in Example 1.

(Step (II))

When the amount of TFE introduced from the initiation of the reaction reached 49 g, unreacted TFE was discharged out of the system to complete polymerization. To the slurry thus obtained, 240 g of methanol was added to agglomerate and separate a copolymer.

(Step (III))

The copolymer was washed with methanol, then subjected to re-esterification, followed by drying to obtain a powdery fluorinated copolymer.

Of the fluorinated copolymer obtained, the ion exchange capacity was 1.063 meq/g dry resin, and the TQ value was 227° C. Further, the molecular weight of the AK-225cb soluble content in the fluorinated copolymer was measured, whereupon the proportion of components having log M being from 2.0 to 3.5 was 18.2 mass % per 100 mass % of components having log M being at least 2.0, contained in the soluble content. The molecular weight distribution is shown in FIG. 1.

Further, by using a fluorinated copolymer obtained, an ion exchange membrane was prepared and evaluated, whereupon the current efficiency before adding Ca/Sr was 96.0%, and the current efficiency after adding Ca/Sr was 93.1%. That is, the decrease in current efficiency due to contamination by calcium ions and strontium ions was 2.9%.

Example 5

(Steps (I) and (II))

54 g of a powdery copolymer was obtained in the same manner as in Example 1.

(Step (III))

270 g of HFE-347pc-f was charged thereto, and stirred at room temperature (15° C.) for 1 hour, followed by filtration. The same operation was carried out twice, followed by drying to obtain a powdery fluorinated copolymer.

The molecular weight of the AK-225cb soluble content in the fluorinated copolymer obtained was measured, whereupon the proportion of components having log M being from 2.0 to 3.5 was 14.6 mass % per 100 mass % of components having log M being at least 2.0, contained in the soluble content.

TABLE 1

| | | Ex. 1 | Ex. 2 | Ex. 3 | Ex. 4 | Ex. 5 |
|---|---|---|---|---|---|---|
| Separation | | Distillation | Distillation | Distillation | Agglomeration by methanol | Distillation |
| Washing solvent | | HFC-365mfc | HFE-347pc-f | Methanol | Methanol | HFE-347pc-f |
| Washing condition | | reflux × 6 | reflux × 2 | reflux × 5 | rt × 1 | rt × 3 |
| Ion exchange capacity [meq./g] | | 1.065 | 1.062 | 1.065 | 1.063 | — |
| TQ value [° C.] | | 226 | 239 | 230 | 227 | — |
| AK-225cb soluble content | logM = 2.0-3.5 [mass %] | 2.1 | 0.6 | 42.7 | 18.2 | 14.6 |
| Current efficiency [%] | Before adding Ca/Sr | 96.7 | 96.7 | 97.0 | 96.0 | — |
| | After adding Ca/Sr | 94.9 | 94.9 | 93.9 | 93.1 | — |
| | Drop width | 1.8 | 1.8 | 3.1 | 2.9 | — |

From comparison of Examples 1, 2 and 3 to 5, it is found that mass % of the components having log M being from 2.0 to 3.5 per 100 mass % of components having log M being at least 2.0 of the AK-225cb soluble content, contained in the fluorinated copolymer, is small in each of Examples 1 and 2, and large in Examples 3 to 5. It is considered that this difference is such that by the difference of polarity and temperature of a solvent to be used for washing, a degree of swelling and extraction efficiency of the fluorinated copolymer vary, whereby the washing property of the low-molecular weight component varies.

Further, since a decrease in current efficiency in electrolysis of the sodium chloride aqueous solution having calcium ions and strontium ions added thereto is small in Examples 1 and 2, but is large in Examples 3 and 4, it is found that the influence by contamination by impurities in the sodium chloride aqueous solution becomes small in the case of the ion exchange membrane in each of Examples 1 and 2.

INDUSTRIAL APPLICABILITY

The fluorinated copolymer of the present invention is useful as an ion exchange membrane to be suitably used for alkali chloride electrolytic process.

This application is a continuation of PCT Application No. PCT/JP2012/062690, filed on May 17, 2012, which is based upon and claims the benefit of priority from Japanese Patent Application No. 2011-111289 filed on May 18, 2011. The contents of those applications are incorporated herein by reference in its entirety.

What is claimed is:

1. A fluorinated copolymer comprising units of i) a fluorinated monomer having a carboxylic acid functional group or a functional group capable of being converted to a carboxylic acid group by hydrolysis or neutralization and ii) a fluorinated olefin,
wherein the proportion of components having a common logarithm (logM) of a molecular weight M of from 2.0 to 3.5 is at most 10 mass % per 100 mass % of components having a common logarithm (logM) of a molecular weight M of at least 2.0, and
wherein the proportion of components is determined by measuring a soluble content of the fluorinated copolymer by the following extraction method:
a powdery fluorinated copolymer comprising units of a fluorinated olefin and a fluorinated monomer having a carboxylic acid functional group or a functional group capable of being converted to a carboxylic acid group by hydrolysis or neutralization is mixed with $CClF_2CF_2CClFH$ with a mass ten times the fluorinated copolymer; a resulting mixture is stirred at 65° C. for 5 or more hours; the mixture is cooled to room temperature, and then methanol with a mass twice the fluorinated copolymer is added to the mixture; the mixture is filtrated, and $CClF_2CF_2CClFH$ and methanol are distilled off from a filtrate to obtain a soluble content.

2. The fluorinated copolymer according to claim 1, which has an ion exchange capacity of from 0.8 to 1.3 meq/g dry resin.

3. The fluorinated copolymer according to claim 1, wherein the fluorinated monomer having a carboxylic acid functional group or a functional group capable of being converted to a carboxylic acid group by hydrolysis or neutralization is represented by formula (1):

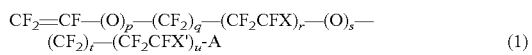
(1)

wherein
X is a fluorine atom or a trifluoromethyl group,
X' is a fluorine atom or a trifluoromethyl group,
A is a carboxylic acid functional group or a functional group capable of being converted to a carboxylic acid group by hydrolysis or neutralization,
p is 0 or 1,
q is an integer of from 0 to 12,
r is an integer of from 0 to 3,
s is 0 or 1,
t is an integer of from 0 to 12, and
u is an integer of from 0 to 3,
1≤p+s, and
1≤r+u.

4. The fluorinated copolymer according to claim 3, wherein the functional group capable of being converted to a carboxylic acid group by hydrolysis or neutralization is at least one member selected from the group consisting of —CN, —COF, —COOR$^1$, —COOM, and —CONR$^2$R$^3$,
wherein R$^1$ is a C$_{1-10}$ alkyl group,
wherein M is an alkali metal or a quaternary ammonium salt group, and
wherein each of R$^2$ and R$^3$ is a hydrogen atom or a C$_{1-10}$ alkyl group, and R$^2$ and R$^3$ may be the same or different.

5. The fluorinated copolymer according to claim 1, wherein the fluorinated olefin is tetrafluoroethylene.

6. The fluorinated copolymer according to claim 1, wherein the proportion of the components having a common logarithm (logM) of a molecular weight M being from 2.0 to 3.5 is at most 5 mass %.

7. The fluorinated copolymer according to claim 1, wherein the functional group capable of being converted to a carboxylic acid group by hydrolysis or neutralization is at least one member selected from the group consisting of —CN, —COF, —COOR$^1$, —COOM, and —CONR$^2$R$^3$,
wherein R$^1$ is a C$_{1-10}$ alkyl group,
wherein M is an alkali metal or a quaternary ammonium salt group, and
wherein each of R$^2$ and R$^3$ is a hydrogen atom or a C$_{1-10}$ alkyl group, and R$^2$ and R$^3$ may be the same or different.

8. The fluorinated copolymer according to claim 1, wherein the fluorinated copolymer is obtained by washing with a fluorinated solvent as a washing solvent.

9. The fluorinated copolymer according to claim 8, wherein the washing solvent is from 1 to 100 times the mass of the fluorinated copolymer.

10. The fluorinated copolymer according to claim 8, wherein the temperature of said washing is from room temperature to 150° C.

11. An ion exchange membrane comprising the fluorinated copolymer as in claim 1.

12. An ion exchange membrane according to claim 11, further comprising
a layer containing a fluorinated copolymer having a sulfonic acid functional group or a functional group capable of being converted to a sulfonic acid group by hydrolysis or neutralization.

13. The ion exchange membrane according to claim 11, which is used for electrolysis of a sodium chloride aqueous solution.

14. A fluorinated copolymer comprising units of i) a fluorinated monomer having a carboxylic acid functional group or a functional group capable of being converted to a carboxylic acid group by hydrolysis or neutralization and ii) a fluorinated olefin,
wherein the proportion of components having a common logarithm (logM) of a molecular weight M of from 2.0 to 3.5 is at most 10 mass % per 100 mass % of components having a common logarithm (logM) of a molecular weight M of at least 2.0,
wherein the fluorinated monomer having a carboxylic acid functional group or a functional group capable of being converted to a carboxylic acid group by hydrolysis or neutralization is represented by formula (1):

(1)

wherein
X is a fluorine atom or a trifluoromethyl group,
X' is a fluorine atom or a trifluoromethyl group, A is a carboxylic acid functional group or a functional group capable of being converted to a carboxylic acid group by hydrolysis or neutralization, p is 1,
q is 0,
r is 1,
s is 0 or 1,
t is an integer of from 1 to 3, and
u is 0 or 1,
$1 \leq p+s$, and
$1 \leq r+u$, and wherein the proportion of components is determined by measuring a soluble content of the fluorinated copolymer by the following extraction method:

a powdery fluorinated copolymer comprising units of a fluorinated olefin and a fluorinated monomer having a carboxylic acid functional group or a functional group capable of being converted to a carboxylic acid group by hydrolysis or neutralization is mixed with $CClF_2CF_2CClFH$ with a mass ten times the fluorinated copolymer; a resulting mixture is stirred at 65° C. for 5 or more hours; the mixture is cooled to room temperature, and then methanol with a mass twice the fluorinated copolymer is added to the mixture; the mixture is filtrated, and $CClF_2CF_2CClFH$ and methanol are distilled off from a filtrate to obtain a soluble content.

15. The fluorinated copolymer according to claim 14, wherein the functional group capable of being converted to a carboxylic acid group by hydrolysis or neutralization is at least one member selected from the group consisting of —CN, —COF, —COOR$^1$, —COOM, and —CONR$^2$R$^3$, wherein R$^1$ is a $C_{1-10}$ alkyl group,
wherein M is an alkali metal or a quaternary ammonium salt group, and
wherein each of R$^2$ and R$^3$ is a hydrogen atom or a $C_{1-10}$ alkyl group, and R$^2$ and R$^3$ may be the same or different.

16. The fluorinated copolymer according to claim 14, wherein the units of the fluorinated monomer having a carboxylic acid functional group or a functional group capable of being converted to a carboxylic acid group by hydrolysis or neutralization are units of:

$CF_2\!\!=\!\!CF\!-\!O\!-\!CF_2CF_2\!-\!CF_2\!-\!COOCH_3$.

17. A process for producing a fluorinated copolymer according to claim 1, the process comprising:
(I) obtaining a fluorinated copolymer by polymerizing a mixture comprising i) a fluorinated monomer having a carboxylic acid functional group or a functional group capable of being converted to a carboxylic acid group by hydrolysis or neutralization and ii) a fluorinated olefin,
(II) separating the fluorinated copolymer from a polymerization medium and unreacted monomer, and
(III) washing the fluorinated copolymer with a washing solvent.

* * * * *